US007058278B2

(12) United States Patent
Murabayashi

(10) Patent No.: US 7,058,278 B2
(45) Date of Patent: Jun. 6, 2006

(54) INFORMATION SIGNAL PROCESSING APPARATUS, INFORMATION SIGNAL PROCESSING METHOD, AND INFORMATION SIGNAL RECORDING APPARATUS

(75) Inventor: Noboru Murabayashi, Saitama (JP)

(73) Assignee: Sony Corporation, Tokyo (JP)

( * ) Notice: Subject to any disclaimer, the term of this patent is extended or adjusted under 35 U.S.C. 154(b) by 1183 days.

(21) Appl. No.: 09/909,208

(22) Filed: Jul. 19, 2001

(65) Prior Publication Data

US 2002/0009284 A1    Jan. 24, 2002

(30) Foreign Application Priority Data

Jul. 21, 2000    (JP) ........................... P2000-220953

(51) Int. Cl.
  *H04N 5/91*    (2006.01)
  *H04N 5/78*    (2006.01)
  *H04N 7/00*    (2006.01)

(52) U.S. Cl. ........................ 386/46; 386/83; 386/95; 386/96

(58) Field of Classification Search ................ 386/1, 386/45, 46, 95, 96, 98, 83
See application file for complete search history.

(56) References Cited

U.S. PATENT DOCUMENTS 6,160,950 A * 12/2000 Shimazaki et al. ........... 386/46
6,285,818 B1   9/2001 Suito et al.
6,449,021 B1   9/2002 Ohta et al.

FOREIGN PATENT DOCUMENTS

| EP | 0 735 754 | 10/1996 |
|---|---|---|
| EP | 0 969 399 | 1/2000 |
| EP | 1 026 887 | 8/2000 |
| EP | 1 158 791 | 11/2001 |
| EP | 1 168 840 | 1/2002 |
| WO | WO 98 27497 | 6/1998 |
| WO | WO 00 07367 | 2/2000 |

OTHER PUBLICATIONS

Patent Abstracts of Japan, vol. 1998, No. 06, Apr. 30, 1998 & JP 10 032776 A (Matsushita Electric Ind Co Ltd), Feb. 3, 1998.
Patent Abstracts of Japan, vol. 2000, No. 09, Oct. 13, 2000 & JP 2000 165796 A (Sony Corp), Jun. 16, 2000.
Patent Abstracts of Japan, vol. 1998, No. 13, Nov. 30, 1998 & JP 10 224722 A (Sony Corp), Aug. 21, 1998.

* cited by examiner

*Primary Examiner*—Robert Chevalier
*Assistant Examiner*—Mishawn Dunn
(74) *Attorney, Agent, or Firm*—Frommer Lawrence & Haug LLP; William S. Frommer

(57) ABSTRACT

An information signal processing apparatus includes a first information signal reading unit for receiving or reading a predetermined first information signal. A second information signal reading unit receives, detects, or reads a second information signal which includes attribute information regarding the first information signal. A characteristic detecting unit detects a predetermined characteristic of the first information signal from the first information signal reading unit.

20 Claims, 9 Drawing Sheets

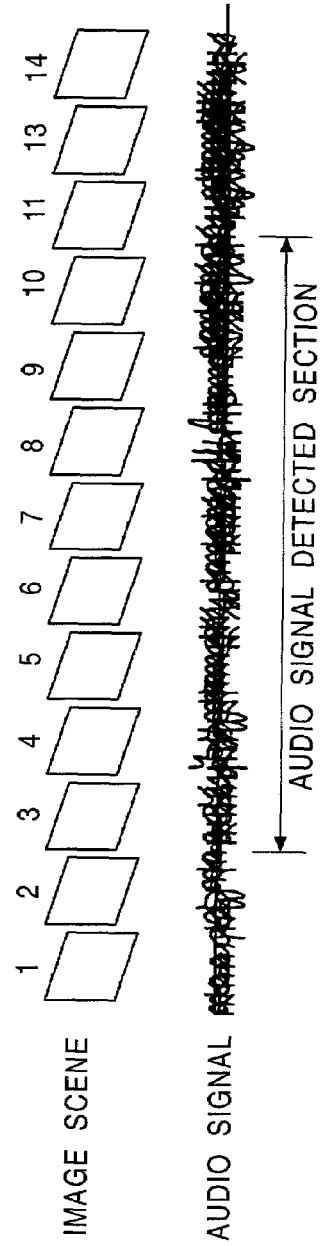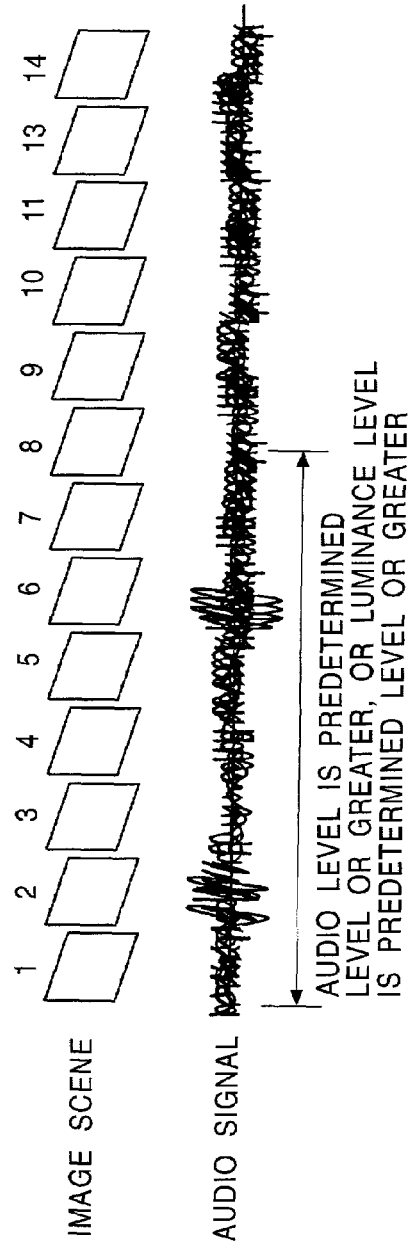

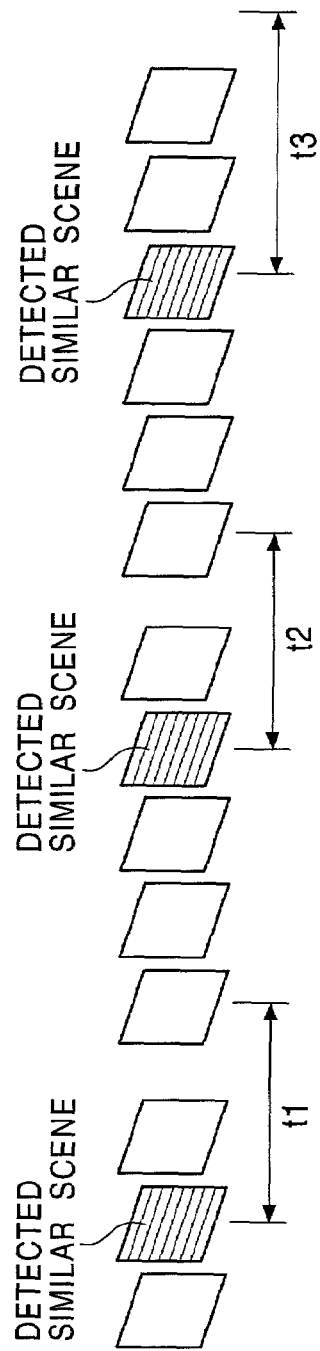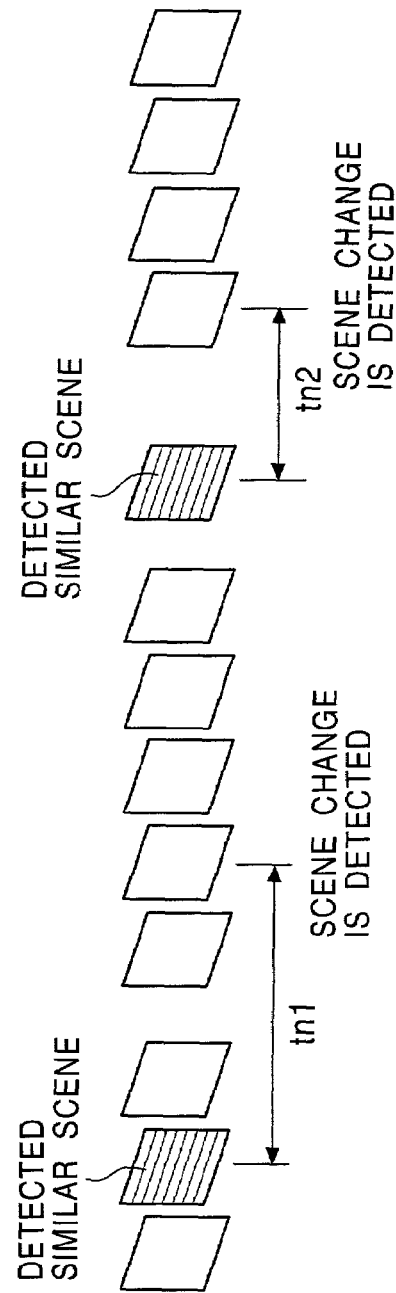

FIG. 8

| GENRE (FIELD) | PREFERRED DETECTION PARAMETER | PURPOSE | | EXAMPLE OF DETECTION METHOD |
|---|---|---|---|---|
| | | PLAY | PLAY AND SKIP | |
| MUSIC PROGRAM | MUSICAL TONE | ○ | | FFT INTERMITTENCE ANALYSIS |
| | LOW AUDIO LEVEL SECTION | | ○ | ANALYSIS OF AVERAGE AUDIO LEVEL IN PREDETERMINED SECTION |
| DRAMA AND MOVIE PROGRAM | SCENE CHANGE | ○ | | IMAGE DIFFERENTIAL PROCESS |
| | PREDETERMINED HIGH AUDIO LEVEL SECTION | ○ | | ANALYSIS OF AVERAGE AUDIO LEVEL IN PREDETERMINED SECTION |
| | SPEAKER AUDIO SECTION | ○ | | FILTERING, FFT ANALYSIS |
| NEWS REPORT PROGRAM | MUSICAL TONE SECTION | | ○ | FFT CONNECTIVITY ANALYSIS |
| | TELOP | ○ | | IMAGE TELOP DETECTION |
| SPORTS PROGRAM | PREDETERMINED HIGH AUDIO LEVEL SECTION | ○ | | ANALYSIS OF AVERAGE AUDIO LEVEL IN PREDETERMINED SECTION |
| | PREDETERMINED COLOR SECTION | ○ | | COLOR SIGNAL ANALYSIS |
| COOKING AND INFORMATIVE PROGRAM | TELOP | ○ | | IMAGE TELOP DETECTION |

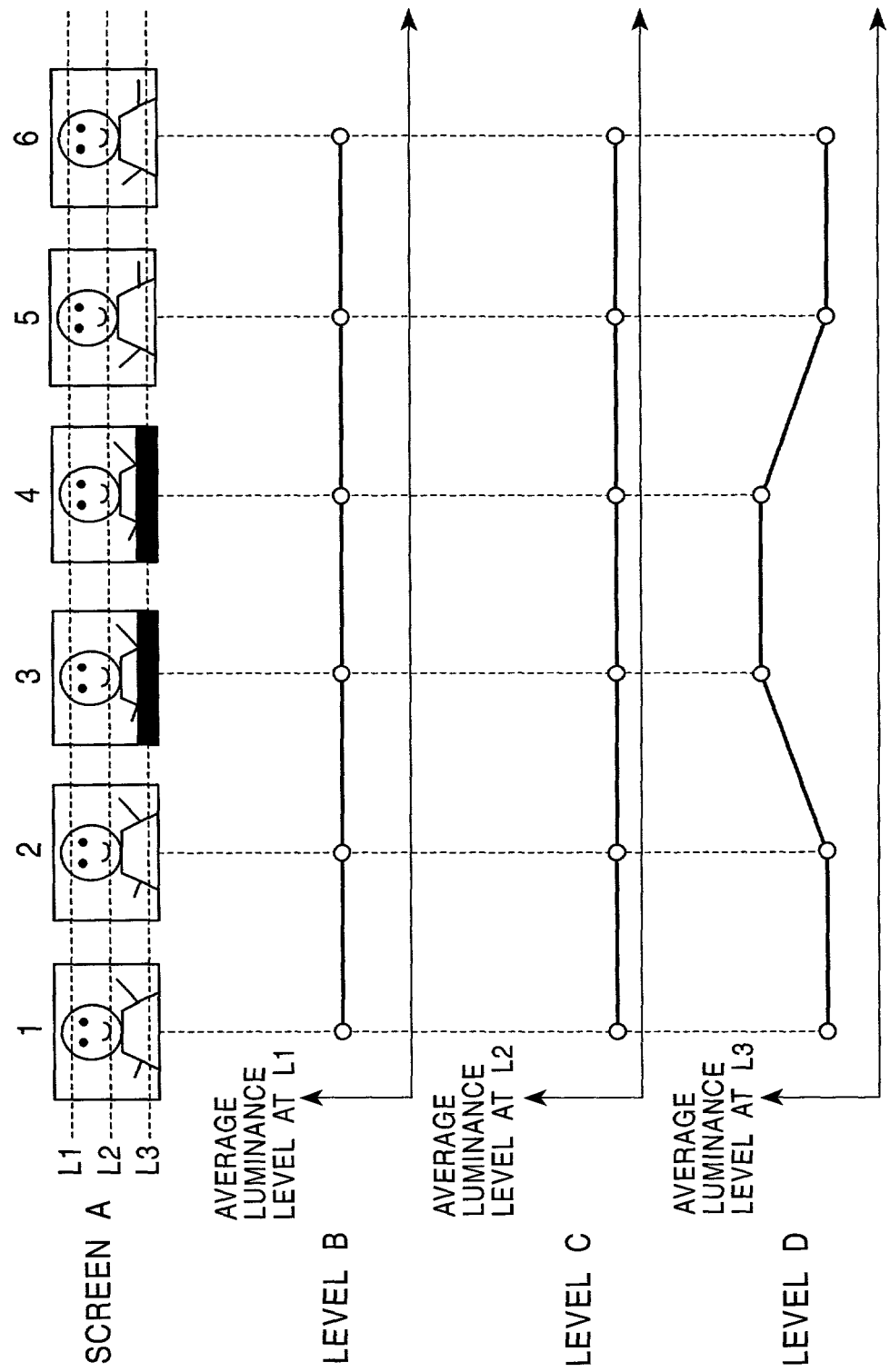

INFORMATION SIGNAL PROCESSING APPARATUS, INFORMATION SIGNAL PROCESSING METHOD, AND INFORMATION SIGNAL RECORDING APPARATUS

BACKGROUND OF THE INVENTION

1. Field of the Invention

The present invention relates to information signal processing apparatuses and information signal processing methods for appropriately playing desired scenes from among recorded broadcast programs, for example, when writing and reading broadcast programs from information signal recording media such as magnetic disks and magnetic tapes.

2. Description of the Related Art

Due to an increase in the recording capacity and a decrease in the price of recording media such as magnetic disks, users often record various broadcast programs for long periods of time. Consequently, a problem arises in that it takes a significant amount of time to play the program.

Methods for minimizing playback time have been proposed. For example, commercials can be detected and skipped, the audio level detected, and portions with low audio levels skipped. A predetermined period of time can simply be skipped and a predetermined section played, and this operation performed repetitively to minimize the playback time.

Alternatively, a scene change can be detected, or sections with large audio levels be detected as climax scenes and preferentially played.

The above-described conventional methods use predetermined detection systems or predetermined skipping systems, and they do not take into consideration the content of the program to be played. Accordingly, scenes which the user does not want to see may be played, or sections that the user wants to see may be skipped or jumped.

When a digest playback of a program such as a news report program in which the same news anchor appears and reads different news articles is performed at substantially regular intervals, the result does not seem to be a digest of the program since there are not great variations in image scenes, although there are variations in sound. As a result, a viewer may feel that the playback is merely a repetition of similar scenes and may not be able to fully understand the contents.

In contrast, when a digest of a music program in which many singers appear is played so that digest playback sections are at approximately regular intervals, a viewer may enjoy the digest playback which is performed in this manner.

In order to edit a music program or to rewind and play the introduction of a song, it may be more time-efficient to play a digest of a program at regular intervals.

There has been no conventional technology which can efficiently control a digest playback in accordance with the contents of a program.

SUMMARY OF THE INVENTION

Accordingly, it is an object of the present invention to provide a technology which can perform appropriate playback in accordance with the contents of a program when performing specialized playbacks such as a digest playback of a broadcast program, a brief playback by skimming a program, similar scene detection, and the like.

According to an aspect of the present invention, the foregoing objects are achieved through provision of an information signal processing apparatus, including a first information signal reading unit for receiving or reading a predetermined first information signal. A second information signal reading unit receives, detects, or reads a second information signal which includes attribute information regarding the first information signal. A characteristic detecting unit detects a predetermined characteristic of the first information signal from the first information signal reading unit in accordance with a signal received or read by the second information signal reading unit.

The first information signal may be a video or audio broadcast program signal.

The second information signal may be a program information signal of a broadcast program.

According to another aspect of the present invention, an information signal processing apparatus is provided, including a first information signal reading unit for receiving or reading a first information signal which includes at least one information signal. A second information signal reading unit receives, detects, or reads a second information signal which includes an attribute of the first information signal. A characteristic detecting unit detects a predetermined characteristic of the first information signal from the first information signal reading unit in accordance with a signal received or read by the second information signal reading unit. A reading control unit controls reading of the first information signal in accordance with a detection signal from the characteristic detecting unit and a signal from the second information signal reading unit.

The first information signal may be a broadcast program which includes at least an audio signal or a video signal.

The attribute of the first information signal may be an information signal which describes the outline or content of the first information signal or classification of information.

The characteristic may be a characteristic used to detect a point which has predetermined similarity or a point which appears to be a climax of a predetermined period of time.

The reading control unit may read a point in the first information signal, which has predetermined similarity, or a point which appears to be a climax of a predetermined period of time.

When it is determined based on the second information signal that the first information signal is a predetermined signal, the reading control unit may perform reading by at least varying the length of a predetermined reading section.

According to another aspect of the present invention, an information signal processing method is provided, including a first-information-signal reading step of receiving or reading a first information signal which includes at least one information signal. In a second-information-signal reading step, a second information signal which includes an attribute of the first information signal is received, detected or read. In a characteristic detecting step, a predetermined characteristic of the first information signal is detected in accordance with a signal received or read in the second-information-signal reading step. In a reading control step, reading of the first information signal is controlled in accordance with a characteristic detection signal and the second information signal.

The first information signal may be a broadcast program which includes at least an audio signal or a video signal.

The attribute of the first information signal may be an information signal which describes the outline or content of the first information signal or classification of information.

The characteristic may be a characteristic used to detect a point which has predetermined similarity or a point which appears to be a climax of a predetermined period of time.

In the reading control step, a point which has predetermined similarity or a point which appears to be a climax of a predetermined period of time may be read.

In the reading control step, when it is determined based on the second information signal that the first information signal is a predetermined signal, reading may be performed by at least varying the length of a predetermined reading section.

According to another aspect of the present invention, an information signal recording apparatus is provided, including an information detecting unit for detecting predetermined information in a first information signal, based on a second information signal which includes an attribute of the first information signal. A characteristic detecting unit detects a predetermined characteristic of the first information signal in accordance with a detection signal from the information detecting unit. An identification signal generating unit generates a predetermined identification signal based on a detection signal from the characteristic detecting unit and the second information signal. A recording unit records the first information signal and the identification signal as predetermined recording signals on a predetermined recording medium.

The first information signal may be a broadcast program which includes at least an audio signal or a video signal.

The information detecting unit may detect an information signal which describes the outline or content of the first information signal or classification of information.

The characteristic may be a characteristic used to detect a point which has predetermined similarity or a point which appears to be a climax of a predetermined period of time.

The identification signal may indicate a point in the first information signal, which has predetermined similarity, or a point which appears to be a climax of a predetermined period of time.

As described above, a first information signal reading unit, such as a tuner of a television, receives or reads a predetermined first information signal, such as a broadcast program. Also, a second information signal reading unit receives or reads a second information signal which includes an attribute, such as the contents of a program or program information, of the first information signal. In accordance with a signal received, detected or read by the second information signal reading unit, a characteristic detecting unit detects a predetermined characteristic which is used to detect a climax scene of the first information signal from the first information signal reading unit or to detect a similar scene. In accordance with a detection signal and the second information signal, a reading control unit controls reading of the first information signal. It is therefore possible to perform digest playback and playback in which predetermined similar scenes are retrieved and played.

A predetermined identification signal can be generated based on a characteristic detection signal. The identification signal and information signals can be recorded on a predetermined recording medium. When reading the recording medium, specialized playback can be performed in accordance with the identification signal.

According to the present invention, it is possible to detect characteristics of broadcast program signals in accordance with the type of a broadcast program. It is thus possible to perform a more accurate playback, skimming, and retrieval of desired similar images. Since a more advantageous digest playback can be performed in accordance with the genre of a program, a viewer can easily view the recorded contents in a short period of time, in a more time-efficient and understandable manner.

BRIEF DESCRIPTION OF THE DRAWINGS

FIGS. 1A and 1B are conceptual diagrams of the principle of operation for processing information signals according to the present invention;

FIGS. 2A and 2B are conceptual diagrams of the principle of playing similar scenes in accordance with a broadcast program which includes the information signals according to the present invention;

FIG. 8 is a table showing a list of examples of preferred detection parameters to be set in accordance with the genre of a program which includes the information signals according to the present invention; and FIG. 9 illustrates the principle of detecting a telop (television opaque projection) based on the information signals according to the present invention.

DESCRIPTION OF THE PREFERRED EMBODIMENTS

Figure 3:
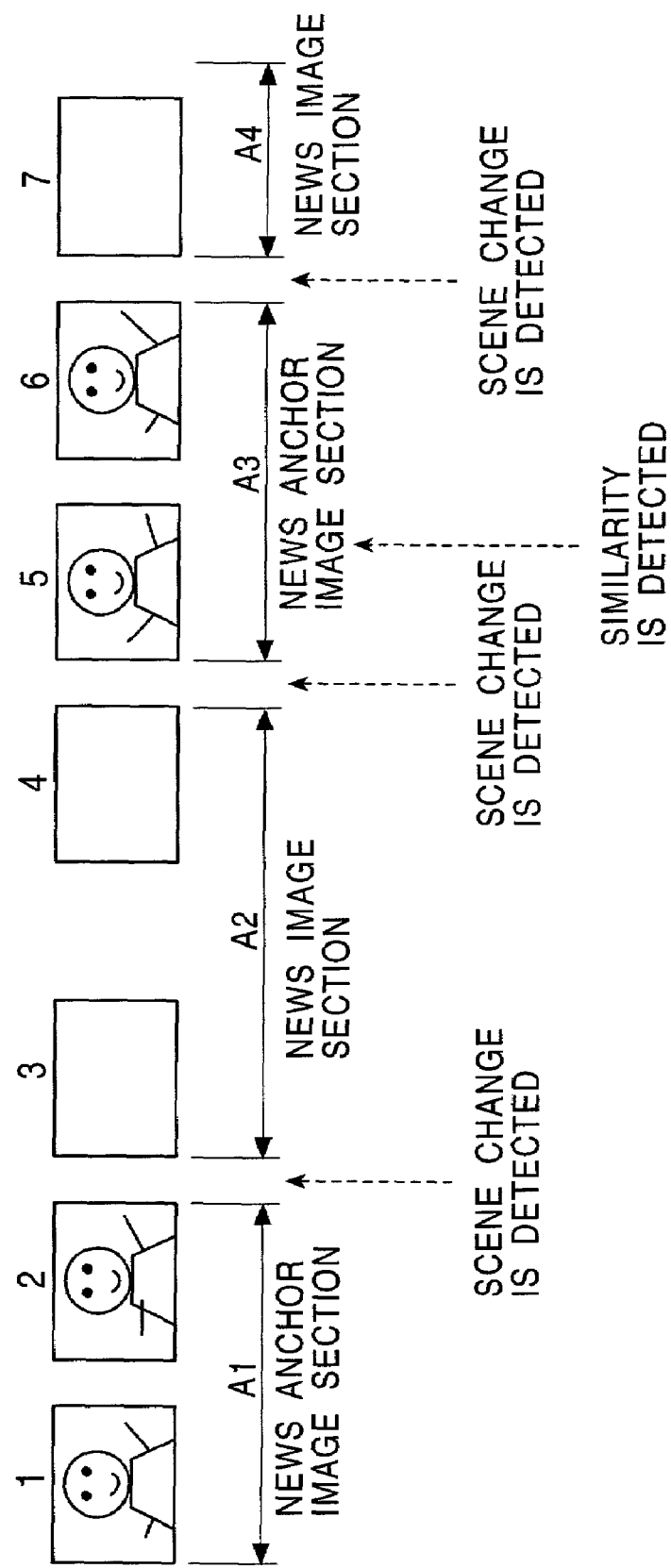
FIG. 3 illustrates the principle of operation using an example of a scene in a news program which includes the information signals according to the present invention.

An information signal processing apparatus, an information signal processing method, and an information signal recording apparatus according to embodiments of the present invention will be described with reference to the accompanying drawings.

The outline of the present invention will now be described. When detecting a climax scene from a broadcast program or a scene similar to one previously viewed, detection parameters for performing climax scene detection or similarity detection are appropriately changed in accordance with program information regarding the broadcast program. Thus, detection can be performed more effectively.

Predetermined playback control is performed in accordance with the detection result and the program information, and thus a digest playback or similar scene detection can be performed. A predetermined identification signal is generated in accordance with the detection result, and the identification signal, together with the broadcast program, is recorded on a recording medium such as a magnetic disk or a semiconductor memory.

Based on the detected program information, the length of a digest playback section is controlled in accordance with the program, e.g., a news program or a music program.

As a result, playback is performed more effectively so that a viewer can easily and quickly understand the recorded content.

The embodiments of the present invention will now be described in the following order:
(1) The principle of operation of the present invention
(2) The structure of the information signal processing apparatus (3) The structure of the information signal recording apparatus (4) The information signal processing method

(1) The Principle of Operation of the Present Invention

FIGS. 1A and 1B are conceptual diagrams of the principle of operation of the present invention.

For example, it is assumed that a broadcast program is received and the program is recorded on a recording medium such as a magnetic disk.

When receiving a broadcast program, a user can find out the genre of the program based on an electronic program guide (EPG). For example, as shown in FIG. 1A, a particular broadcast program is received. Based on the EPG, the user finds out that the program is a music program.

In general, viewers of a music program want to watch scenes in which singers perform and want to know the singer, the song, and what point in the program the performance will take place. When viewers want to find out the content of the program quickly based on a digest playback, it is very efficient to only play scenes in which singers are performing.

In order to do this, audio signals are detected, and spectral analysis of the audio signals is performed to determine the musical tone sections. Detected scenes (audio signal detected sections) are distinguished using identification signals or the like. Afterwards, it is possible to easily perform a digest playback of scenes in which singers perform.

Referring to FIG. 1B, if it is determined based on the EPG that the genre of a program is drama or movie, it is understood that a scene change or a large-audio-level section (in which the audio level is equal to a predetermined level or grater or the luminance level is equal to a predetermined level or greater) is often a climax scene. Thus, such sections are detected.

When such sections are detected, it is possible to perform a digest playback in an efficient manner similar to the foregoing music program.

When the broadcast program is a news report program, it is understood that an efficient digest program can be performed by playing newscaster audio scenes. It is preferable that musical tone sections, which are to be detected in the above-described music program, be skipped.

As described above, detection parameters for detecting audio sections and image scene sections are appropriately changed in accordance with the contents and the genre of a program. Thus, it is possible to perform section detection in accordance with the program in a more efficient manner. As a result, more accurate digest playback and similarity detection can be performed.

FIGS. 2A and 2B are conceptual diagrams of a digest playback according to the present invention. Referring to FIG. 2A, when performing a digest playback of a music program, musical tone sections are detected, and the digest playback is performed at substantially regular intervals of t1, t2, and t3. Accordingly, a viewer can efficiently find out the contents of a song, which is sung by a singer in the program, in a short period of time.

In the case of a news program, in general, the same news anchor reads news documents. When a digest of the news program is played at substantially regular intervals as in the music program, scenes in which the news anchor is speaking are played. In this way, a viewer may feel that the contents of the digest playback are monotonous and may not be able to understand the content.

As shown in FIG. 2B, digest playback intervals tn1, tn2, . . . can be changed. If necessary, the playback can be controlled so that it skips to the subsequent section at a point at which a news image has been broadcast for a predetermined period of time after the news anchor finishes reading the document describing the outline of the news.

FIG. 3 shows an example of a news program. Often times, a news anchor is on the screen in sections A1 and A3, and news images are broadcast in sections A2 and A4.

Specifically, the scenes change between sections A1 and A2, between sections A2 and A3, and between sections A3 and A4. It is possible to perform scene change detection, in addition to similarity detection, so that news images are played for a predetermined period of time.

Accordingly, it is possible to reduce the chance that a digest playback will be monotonous because of reproducing only scenes in which the news anchor appears. In this way, the viewer can understand the content more easily. In order to perform a digest playback in a shorter period of time, it is possible to play a digest up to a point at which a scene change is detected.

In this case, only image scenes in which the news anchor appears are played. In order to prevent the digest playback from becoming monotonous, the length of a playback section can be changed every time a digest playback is performed.

Figure 4A:
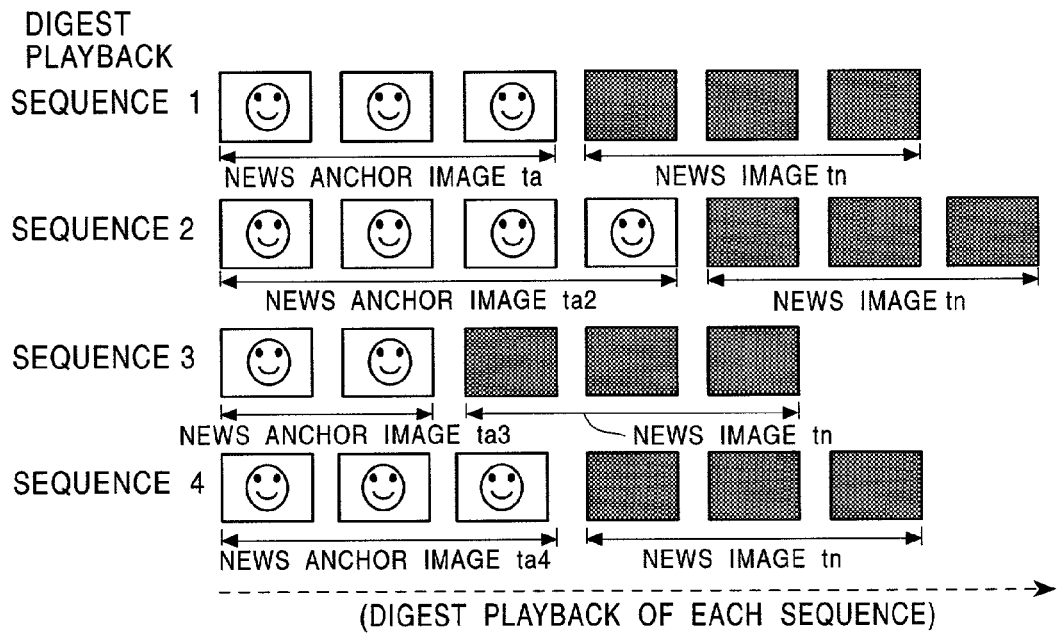
FIGS. 4A and 4B illustrate the principle of controlling digest playback sequences in accordance with the genre of a program which includes the information signals according to the present invention.
Figure 4B:
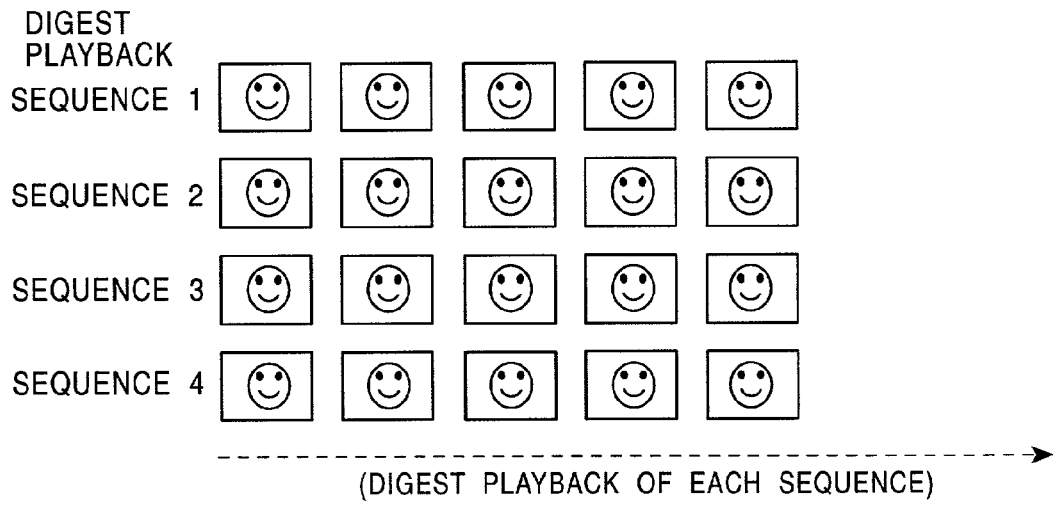

FIGS. 4A and 4B are conceptual diagrams of the length of a digest playback of a news program and a music program as examples. FIG. 4A shows a case of the news program, and FIG. 4B shows a case of the music program. In FIGS. 4A and 4B, the transverse direction corresponds to playback time of each digest playback sequence.

Referring to FIG. 4A showing the news program, a scene in which a news anchor is on the screen is played. Subsequently, the scene changes to a news image scene, which is played for a predetermined period of time. In FIG. 4A, a news image section tn is the same in each digest playback sequence in order to simplify the description.

If the sum of a news anchor image section ta and the news image section tn is the same in each digest playback sequence, it is less likely that news image portions in these sequences are the same. Thus, the possibility of the entire digest playback becoming monotonous is low.

Alternatively, it is possible to make news anchor image portions in a news program the same in accordance with a viewer's preference.

(2) The Structure of the Information Signal Processing Apparatus

Figure 5:
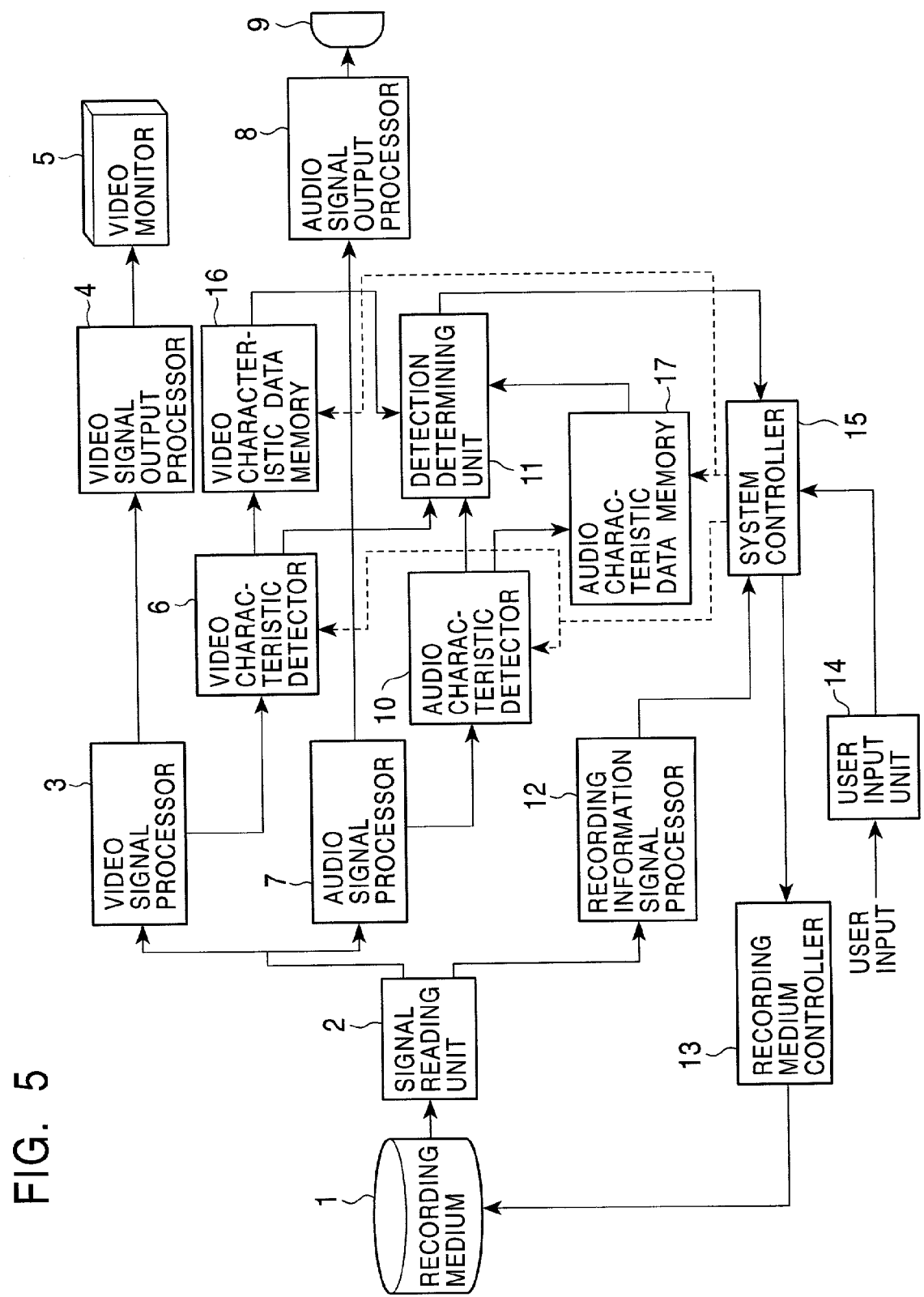
FIG. 5 is a block diagram of an information signal processing apparatus according to an embodiment of the present invention.

FIG. 5 shows an example of the structure of the information signal processing apparatus according to the embodiment of the present invention. The structure includes a recording medium 1 which is a hard disk or a magneto-optical disk; a signal reading unit 2 for reading signals from the recording medium 1; a video signal processor 3 for processing video signals from among the read signals; a video signal output processor 4 for outputting the video signals detected by the video signal processor 3; a video monitor 5 for displaying the output video signals; a video characteristic detector 6 for detecting characteristics of the video signals from the video signal processor 3; an audio signal processor 7 for processing audio signals separated by the signal reading unit 2; an audio signal output processor 8 for outputting the audio signals from the audio signal processor 7; an audio output unit 9 for outputting the audio signals from the audio signal output processor 8; an audio characteristic detector 10 for detecting characteristics of the audio signals from the audio signal processor 7; a detection determining unit 11 for determining the video signal characteristics detected by the video characteristic detector 6 and the audio signal characteristics detected by the audio characteristic detector 10; a recording information signal detector 12 for detecting recording information signals from among the signals read by the signal reading unit 2; a recording medium controller 13 for controlling the recording of the recording medium 1; a user input unit 14 for inputting signals entered by a user by performing a predetermined operation; a system controller 15 for controlling the video characteristic detector 6, the audio characteristic detector 10, the detection determining unit 11, the recording information signal detector 12, the recording medium controller 13, the user input unit 14, a video characteristic data memory 16, and an audio characteristic data memory 17; the video characteristic data memory 16 for storing the video signal characteristics detected by the video characteristic detector 6; and the audio signal characteristics data memory 17 for storing the audio signal characteristics detected by the audio characteristic detector 10.

In the information signal processing apparatus with the foregoing arrangement, the recording medium 1 is a recording medium such as a hard disk or a magneto-optical disk. First information signals, such as a predetermined broadcast program and other video/audio signals, and second information signals, such as the genre of the recorded broadcast program or the contents of the recorded information signals, identification signals, and the like, are recorded in a predetermined recording region on the recording medium 1 in a predetermined recording format.

The signal reading unit 2 reads the information signals, which have been recorded on the recording medium 1 in the predetermined recording format, in a predetermined reading format. Also, the signal reading unit 2 performs various signal reading processes such as error-correction coding (ECC) and separation of video signals and audio signals.

From among the read signals, the video signals are input to the video signal processor 3, and the audio signals are input to the audio signal processor 7. The video and audio signals undergo predetermined decoding or the like. The processed video signals are input to the video characteristic detector 6, and the audio signals are input to the audio characteristic detector 10. Predetermined characteristic signals of the video and audio signals are detected.

The second information signals are detected by the recording information signal detector 12. In accordance with the detected information signals, detection parameters for the video characteristic detector 6 and the audio characteristic detector 10 are changed. Thus, the predetermined characteristic signals can be detected.

FIG. 8 is a table of examples of preferred detection parameters which are set based on the detected second information signals. FIG. 8 shows detection parameters which are to be preferentially detected. Detection of general parameters such as silent sections is also performed in accordance with desired digest playback time.

For example, FIG. 8 indicates that musical tone sections are preferentially detected in a music program. As described in "Video browsing interface using sound information", The Institute of Image Information and Television Engineers technical report (Feb. 3, 1995), musical tone detection is performed by detecting a spectrum envelop of a signal and detecting its characteristics.

FIG. 9 shows the principle of detecting a telop (television opaque projection) screen in the news program shown in FIG. 8. Screen A shows scenes 1, 2, 3, 4, 5, 6, ... of the news program. It is assumed that news telops are broadcast in screens 3 and 4.

As shown in screen A of FIG. 9, the average luminance level at each of three positions L1, L2, and L3 is considered. In screens 1 to 6, there are almost no scene changes. The average luminance level at position L1, which is indicated by level B, and the average luminance level at position L2, which is indicated by level C, do not vary very much. In contrast, the average luminance level at position L3, which is indicated by level D, increases at screens 3 and 4 in which the telops appear at the bottom of the screen.

In a news program, telop characters in white generally appear on the screen. Thus, at the time a telop appears, the average luminance level increases.

By detecting a scene change and the average luminance level in a predetermined portions, it is possible to detect a point at which telop characters are very likely to appear on the screen.

Scene change detection can be performed by detecting a differential variation in the average luminance level between frames and determining whether or not the differential variation is within a predetermined preset value. Alternatively, scene change detection can be performed by detecting a difference in image data between frames.

Although programs such as music programs, drama and movie programs, news report programs, sports programs, variety shows, cooking programs, and other informative programs have been described, additional genres can be added if necessary. Also, more appropriate detection parameters can be set.

As described in the principle of operation of the present invention, for example, a digest playback around a news anchor portion of a news program can be performed so that a viewer can understand the content of the program quickly. To do so, the viewer uses the user input unit 14 to designate similarity detection at the time the news anchor appears on the screen during the news program.

The designation is input to the system controller 15, and predetermined characteristic data detected by the video characteristic detector 6 or the audio characteristic detector 10 at that time are temporarily stored in the video characteristic data memory 16 or the audio characteristic data memory 17.

When performing similarity detection in the case of video signals, the characteristic data include luminance signals in predetermined portions and predetermined compressed data processed by the video signal processor 3. The data are sequentially detected, and the detection determining unit 11 computes correlation between the sequentially-detected data and the data stored in the video characteristic data memory 16.

In the case of audio signals, similar operation is performed. Data in a frequency region, which is processed by the audio signal processor 7, is detected by the audio characteristic detector 10. Characteristic data at the time the designation is input is temporarily stored in the audio characteristic data memory 17. Correlation of this data with characteristic data which are sequentially detected is computed.

As a result of the computation, when predetermined correlation is detected, similarity detection is performed. The system controller 15 controls the recording medium controller 13 so that a predetermined section containing the detected point is played.

(3) The Structure of the Information Signal Recording Apparatus

Figure 6:
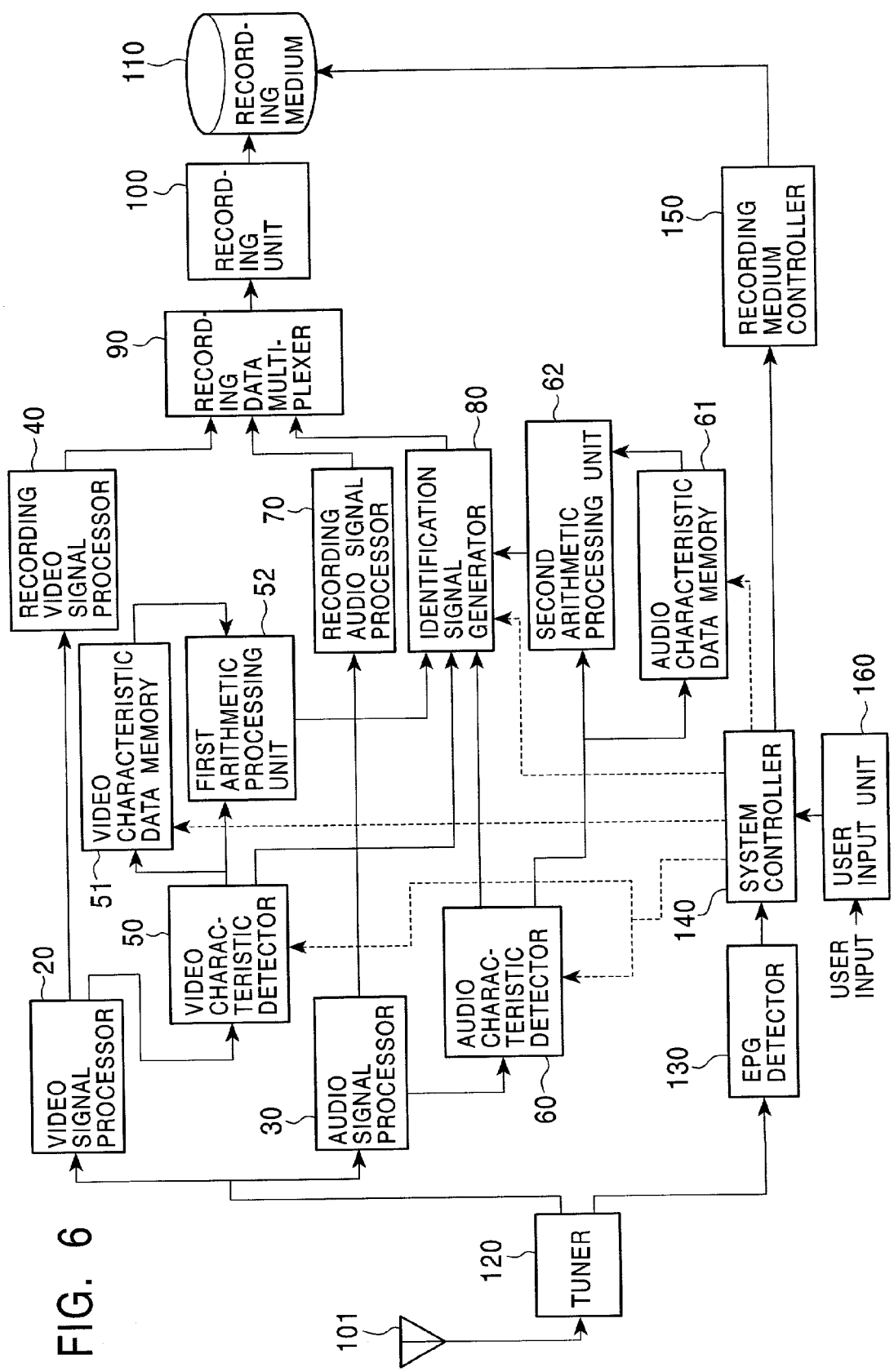
FIG. 6 is a block diagram of an information signal recording apparatus according to an embodiment of the present invention.

FIG. 6 shows an example of the structure of the information signal recording apparatus according to the embodiment of the present invention. The structure includes a tuner 120 for receiving signals from an antenna 101; a video signal processor 20 for processing video signals from among the signals received by the tuner 120; an audio signal processor 30 for processing audio signals received by the tuner 120; a recording video signal processor 40 for processing video signals to be recorded from among the video signals processed by the video signal processor 20; a video characteristic detector 50 for detecting characteristics of the video signals from the video signal processor 20; a video characteristic data memory 51 for storing the video signal characteristics detected by the video characteristic detector 50 in a memory; a first arithmetic processing unit 52 for performing arithmetic processing such as comparison between the video signal characteristics detected by the video characteristic detector 50 and the video data stored in the video characteristic data memory 51; an audio characteristic detector 60 for detecting characteristics of the audio signals processed by the audio signal processor 30; an audio characteristic data memory 61 for storing the audio signal characteristics detected by the audio characteristic detector 60; a second arithmetic processing unit 62 for performing arithmetic processing such as comparison between the audio signal characteristics detected by the audio characteristic detector 60 and the audio data stored in the audio characteristic data memory 61; a recording audio signal processor 70 for processing audio signals to be recorded, from among the audio signals processed by the first arithmetic processing unit 52 and the video characteristic detector 50 at the video signal side, by the audio characteristic detector 60, and by the audio signal processor 30; an identification signal generator 80 for generating identification signals based on the signals from the second arithmetic processing unit 62 at the audio signal side; a recording data multiplexer 90 for multiplexing the signals from the recording video signal processor 40, the recording audio signal processor 70, and the identification signal generator 80; a recording unit 100 for recording the multiplexed signals; an EPG detector 130 for detecting EPG from signals from a recording medium 110 to be recorded and from the tuner 120; a system controller 140 for controlling the EPG detector 130, the video characteristic detector 50, the audio characteristic detector 60, the video characteristic data memory 51, the identification signal generator 80, the audio characteristic data memory 61, a recording medium controller 150, and a user input unit 160; the recording medium controller 150 for controlling the recording medium 110; and the user input unit 160 for inputting signals entered by the user.

In the information signal recording apparatus with the foregoing arrangement, broadcast program signals and EPG information signals are received by the antenna 101 and the tuner 120.

From among the received broadcast program signals, video signals are input to the video signal processor 20 and undergo predetermined signal processing such as video signal demodulation. Audio signals are input to the audio signal processor 30 and similarly undergo predetermined signal processing such as audio signal demodulation.

The video signals that have undergone predetermined signal processing are input to the recording video signal processor 40 and the video characteristic detector 50.

The audio signals that have undergone predetermined signal processing are input to the recording audio signal processor 70 and the audio characteristic detector 60.

The signals from the tuner 120 are also input to the EPG detector 130, and the input signals are regarded as signals different from the broadcast program. From the input signals, program information, such as the genre of the broadcast program, is detected. The detected predetermined information signals are input to the system controller 140.

In accordance with the detected EPG information signals, predetermined characteristic data are detected by the video characteristic detector 50 and the audio characteristic detector 60, respectively, from among the broadcast program signals processed by the video signal processor 20 and the audio signal processor 30. In accordance with the detection results, the identification signal generator 80 generates predetermined identification signals.

As described in the principle of operation of the present invention, at the time of recording, for example, a digest playback around a news anchor portion of a news program can be performed so that a viewer can understand the content of the program quickly. In order to do this, the viewer uses the user input unit 160 to designate similarity detection at the time the news anchor appears on the screen during the news program.

The designation is input to the system controller 140. Predetermined characteristic data detected at that time by the video characteristic detector 50 or by the audio characteristic detector 60 is temporarily stored in the video characteristic data memory 51 or the audio characteristic data memory 61.

When performing similarity detection in the case of video signals, characteristic data include luminance signals in predetermined portions, predetermined compressed data processed by the video signal processor 20, and the like. The data are sequentially detected. The first arithmetic processing unit 52 computes correlation between the sequentially-detected data and the data stored in the video characteristic data memory 51.

In the case of audio signals, similar processing is performed. Data in a frequency region, which is processed by the audio signal processor 30, is detected by the audio characteristic detector 60. Characteristic data at the time of designation is temporarily stored in the audio characteristic data memory 61. Predetermined correlation processing is computed between the sequentially-detected characteristic data and the data stored in the audio characteristic data memory 61.

As a result of the computation, when predetermined correlation is detected, similarity detection is performed. At the time similarity is detected, the identification signal generator 80 generates a predetermined identification signal. The recording data multiplexer 90 multiplexes the identification signal, the video recording data, and the audio recording data. The recording unit 100 performs predetermined ECC interleaving or the like. Subsequently, the data is recorded on the recording medium 110.

In this case, it is also possible to cause the identification signal generator 80 to generate a predetermined identification signal so that the identification signal is read and detected at the time of reading. Accordingly, a predetermined section including a point at which similarity is detected is played.

(4) The Information Signal Processing Method

Figure 7:
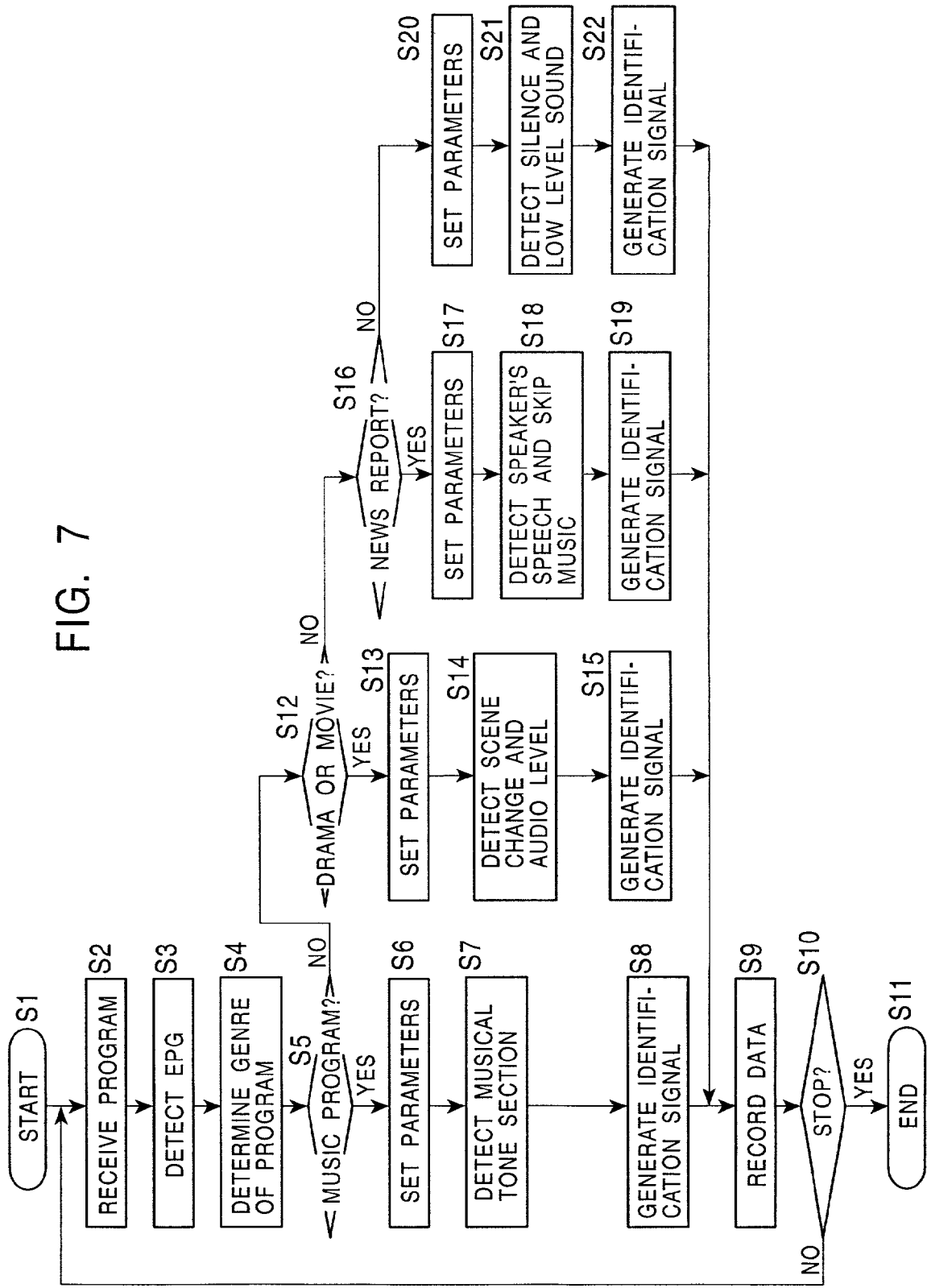
FIG. 7 is a flowchart showing an example of a process performed the information signal processing apparatus.

FIG. 7 shows an example of a process performed by the information signal processing apparatus of the embodiment of the present invention.

In step S1, the process starts. In step S2, the process receives a program. In step S3, the process detects program information based on EPG.

In step S4, the process determines the genre of the program. In step S5, the process determines whether or not the program is a music program. If the determination is negative, the process determines in step S12 whether or not the program is a drama or movie program. If the determination is negative, the process determines in step S16 whether or not the program is a news report program.

If it is determined in step S5 that the program is a music program, in step S6, the process sets detection parameters as musical tone detection parameters. In step S7, the process detects a musical tone section. In step S8, the process generates a predetermined identification signal indicating that the musical tone section has been detected. In step S9, the process performs predetermined recording signal processing of the received broadcast program data and the identification signal, and records the data on a recording medium.

In step S10, the process determines whether to stop the operation. If the operation is stopped by a user, the process is terminated in step S11. If the operation is not stopped, the process returns to step S2, and the operation is repeated.

If it is determined in step S12 that the program is a drama or movie program, in step S13, the process sets detection parameters in order to detect scene changes and climax scenes in which the audio level is a predetermined level or greater or the luminance of a screen is a predetermined level or greater.

In step S14, the foregoing scene section is detected. In step S15, the process generates a predetermined identification signal which indicates the detected section. In step S9, the process performs predetermined recording signal processing of the received broadcast program data and the identification signal, and records the data on the recording medium.

If it is determined in step S16 that the program is a news report program, in step S17, the process sets detection parameters as those suitable for the news report program, such as for speaker speech detection and musical tone skipping.

In step S18, the process detects the foregoing scene section. In step S19, the process generates a predetermined identification signal which indicates the detected section. In step S9, the process performs predetermined recording signal processing of the received broadcast program data and the identification signal, and records the data on the recording medium.

In the foregoing description, music programs, drama and movie programs, and news report programs have been described. Alternatively, detection parameters suitable for genres such as sports programs, variety shows, and the like, can be set, and detection can be performed accordingly.

In this embodiment, in order to simplify the description, when the process determines in step S16 that the genre of the program is other than the above three types, in step S20, the process sets detection parameters for detecting silence and low-level audio. In step S21, the process performs such detection. In step S22, the process generates an identification signal. In step S9, the process performs predetermined recording signal processing of the received broadcast program data and the identification signal, and records the data in the recording medium.

What is claimed is:

1. An information signal processing apparatus comprising:
   first information signal reading means for reading a predetermined first information signal;
   second information signal reading means for reading a second information signal which includes attribute information regarding the first information signal; and
   characteristic detecting means for detecting a predetermined characteristic of the first information signal from said first information signal reading means in accordance with said second information signal read by said second information signal reading means;
   wherein said predetermined characteristic is selected from audio characteristics and video characteristics of the first information signal on the basis of a genre of said first information signal.

2. An information signal processing apparatus according to claim 1, wherein the first information signal comprises a video or audio broadcast program signal.

3. An information signal processing apparatus according to claim 1, wherein the second information signal comprises a program information signal of a broadcast program.

4. An information signal processing apparatus comprising:
   first information signal reading means for reading a first information signal which comprises at least one information signal;
   second information signal reading means for reading a second information signal which includes an attribute of the first information signal;
   characteristic detecting means for detecting a predetermined characteristic of the first information signal from said first information signal reading means in accordance with said second information signal read by said second information signal reading means; and
   reading control means for controlling reading of the first information signal in accordance with a detection signal from said characteristic detecting means and said second information signal from said second information signal reading means;
   wherein said predetermined characteristic is selected from audio characteristics and video characteristics of the first information signal on the basis of a genre of said first information signal.

5. An information signal processing apparatus according to claim 4, wherein the first information signal comprises a broadcast program which includes at least an audio signal or a video signal.

6. An information signal processing apparatus according to claim 4, wherein the attribute of the first information signal comprises an information signal which describes the outline or content of the first information signal or classification of information.

7. An information signal processing apparatus according to claim 4, wherein the characteristic comprises a characteristic used to detect a point which has predetermined similarity or a point which appears to be a climax of a predetermined period of time.

8. An information signal processing apparatus according to claim 4, wherein said reading control means reads a point in the first information signal, which has predetermined similarity, or a point which appears to be a climax of a predetermined period of time.

9. An information signal processing apparatus according to claim 4, wherein, when it is determined based on the second information signal that the first information signal comprises a predetermined signal, said reading control means performs reading by at least varying the length of a predetermined reading section.

10. An information signal processing method comprising:
   a first-information-signal reading step of reading a first information signal which comprises at least one information signal;
   a second-information-signal reading step of reading a second information signal which includes an attribute of the first information signal;
   a characteristic detecting step of detecting a predetermined characteristic of the first information signal in accordance with said second information signal read in said second information signal reading step; and
   a reading control step of controlling reading of the first information signal in accordance with a characteristic detection signal and the second information signal;
   wherein said predetermined characteristic is selected from audio characteristics and video characteristics of the first information signal on the basis of a genre of said first information signal.

11. An information signal processing method according to claim 10, wherein the first information signal comprises a broadcast program which includes at least an audio signal or a video signal.

12. An information signal processing method according to claim 10, wherein the attribute of the first information signal comprises an information signal which describes the outline or content of the first information signal or classification of information.

13. An information signal processing method according to claim 10, wherein the characteristic comprises a characteristic used to detect a point which has predetermined similarity or a point which appears to be a climax of a predetermined period of time.

14. An information signal processing method according to claim 10, wherein, in said reading control step, a point which has predetermined similarity or a point which appears to be a climax of a predetermined period of time is real.

15. An information signal processing method according to claim 10, wherein, in said reading control step, when it is determined based on the second information signal that the first information signal comprises a predetermined signal, reading is performed by at least varying the length of a predetermined reading section.

16. An information signal recording apparatus, comprising:
   information detecting means for detecting predetermined information in a first information signal, based on a second information signal which includes an attribute of the first information signal;
   characteristic detecting means for detecting a predetermined characteristic of the first information signal in accordance with a detection signal from said information detecting means;
   wherein said predetermined characteristic is selected from audio characteristics and video characteristics of the first information signal the basis of a genre off said first information signal;
   identification signal generating means for generating a predetermined identification signal based on said detection signal from said characteristic detecting means and the second information signal; and
   recording means for recording the first information signal and the identification signal as predetermined recording signals on a predetermined recording medium.

17. An information signal recording apparatus according to claim 16, wherein the first information signal comprises a broadcast program which includes at least an audio signal or a video signal.

18. An information signal recording apparatus according to claim 16, wherein said information detecting means detects an information signal which describes the outline or content of the first information signal or classification of information.

19. An information signal recording apparatus according to claim 16, wherein the characteristic comprises a characteristic used to detect a point which has predetermined similarity or a point which appears to be a climax of a predetermined period of time.

20. An information signal recording apparatus according to claim 16, wherein the identification signal indicates a point in the first information signal, which has predetermined similarity, or a point which appears to be a climax of a predetermined period of time.

* * * * *